US009784394B2

(12) United States Patent
Sannadi et al.

(10) Patent No.: US 9,784,394 B2
(45) Date of Patent: Oct. 10, 2017

(54) LEVER QUICK CONNECT INTERCOM FITTING

(71) Applicant: Zodiac Aerosafety Systems, Caudebec-les-Elbeuf (FR)

(72) Inventors: Amine Sannadi, Rouen (FR); Nicolas Picco, Abondant (FR)

(73) Assignee: Zodiac Aerosafety Systems, Cognac (FR)

( * ) Notice: Subject to any disclaimer, the term of this patent is extended or adjusted under 35 U.S.C. 154(b) by 0 days.

(21) Appl. No.: 15/202,596

(22) Filed: Jul. 6, 2016

(65) Prior Publication Data
US 2016/0312938 A1    Oct. 27, 2016

Related U.S. Application Data

(63) Continuation of application No. 14/154,267, filed on Jan. 14, 2014, now Pat. No. 9,404,610.

(60) Provisional application No. 61/752,114, filed on Jan. 14, 2013.

(51) Int. Cl.
*F16L 37/12* (2006.01)
*F16L 37/18* (2006.01)
*B64D 37/00* (2006.01)

(52) U.S. Cl.
CPC ............ *F16L 37/12* (2013.01); *B64D 37/005* (2013.01); *F16L 37/18* (2013.01)

(58) Field of Classification Search
CPC ........ F16L 37/1235; F16L 37/18; F16L 37/12; F16L 37/122; F16L 37/096; F16L 37/127; F16L 37/20; F16L 2201/20
USPC ........ 285/319, 317, 312, 88, 89, 316, 81, 84, 285/85, 86
See application file for complete search history.

(56) References Cited

U.S. PATENT DOCUMENTS

| 925,959 | A | * | 6/1909 | Smith | F16L 37/248 |
| | | | | | 285/280 |
| 989,251 | A | * | 4/1911 | Hall | F16L 37/127 |
| | | | | | 277/613 |
| 3,041,089 | A | * | 6/1962 | Purves | F16L 37/1235 |
| | | | | | 285/148.19 |
| 3,314,698 | A | * | 4/1967 | Owens | F16L 37/18 |
| | | | | | 285/312 |

(Continued)

FOREIGN PATENT DOCUMENTS

| DE | 3917643 | 12/1990 | |
| DE | 3917643 A1 | * 12/1990 | .......... F16L 37/1235 |

(Continued)

OTHER PUBLICATIONS

International Patent Application No. PCT/IB2014/058267, International Preliminary Report on Patentability dated Jul. 23, 2015.
International Patent Application No. PCT/IB2014/058267, Search Report and Written Opinion dated Apr. 17, 2014.
*U.S. Appl. No. 14/154,267, Notice of Allowance dated Mar. 11, 2016.

*Primary Examiner* — Christine T Cajilig
(74) *Attorney, Agent, or Firm* — Kilpatrick Townsend & Stockton LLP; Dean W. Russell; Kristin M. Crall

(57) ABSTRACT

Embodiments of the present invention provide a lever quick connect and disconnect fitting that provides a secure fit for tank-to-tank connections and prevents any leakage from occurring. The fitting provide two separate, independent locking features that can secure tank sleeves to one another. There is provided male and female components that are coupled together by a lever connect and by a safety ring.

18 Claims, 14 Drawing Sheets

(56) References Cited

U.S. PATENT DOCUMENTS

| | | | | |
|---|---|---|---|---|
| 3,711,135 | A * | 1/1973 | Akesson | F16L 37/1235 285/70 |
| 3,953,058 | A * | 4/1976 | Soblesky | F16L 37/18 285/110 |
| 4,519,635 | A * | 5/1985 | McMath | F16L 37/18 285/312 |
| 4,768,006 | A * | 8/1988 | Trift | H05K 7/1411 285/311 |
| 4,842,309 | A * | 6/1989 | LaVene | F16L 37/0842 285/319 |
| 5,067,690 | A | 11/1991 | Bac | |
| 5,439,258 | A * | 8/1995 | Yates | F16L 37/138 285/313 |
| 7,147,004 | B1 * | 12/2006 | Hartman | F16L 37/18 137/614.06 |
| 2010/0314868 | A1 * | 12/2010 | Fahie | F16L 37/18 285/308 |
| 2012/0037247 | A1 * | 2/2012 | Konishi | F16L 37/23 137/515.5 |
| 2014/0021714 | A1 * | 1/2014 | Ueda | A61M 39/1011 285/81 |
| 2014/0284921 | A1 * | 9/2014 | van der Valk | F16L 37/248 285/312 |
| 2015/0069755 | A1 * | 3/2015 | Bull | E21B 33/038 285/406 |

FOREIGN PATENT DOCUMENTS

| | | | |
|---|---|---|---|
| DE | EP 1924801 B1 * | 7/2016 | F16L 25/0045 |
| EP | 1378445 | 1/2004 | |
| FR | 2528148 | 12/1983 | |
| GB | 552722 | 4/1943 | |
| GB | 552899 | 4/1943 | |
| IL | WO 2008059490 A1 * | 5/2008 | F16L 37/096 |

\* cited by examiner

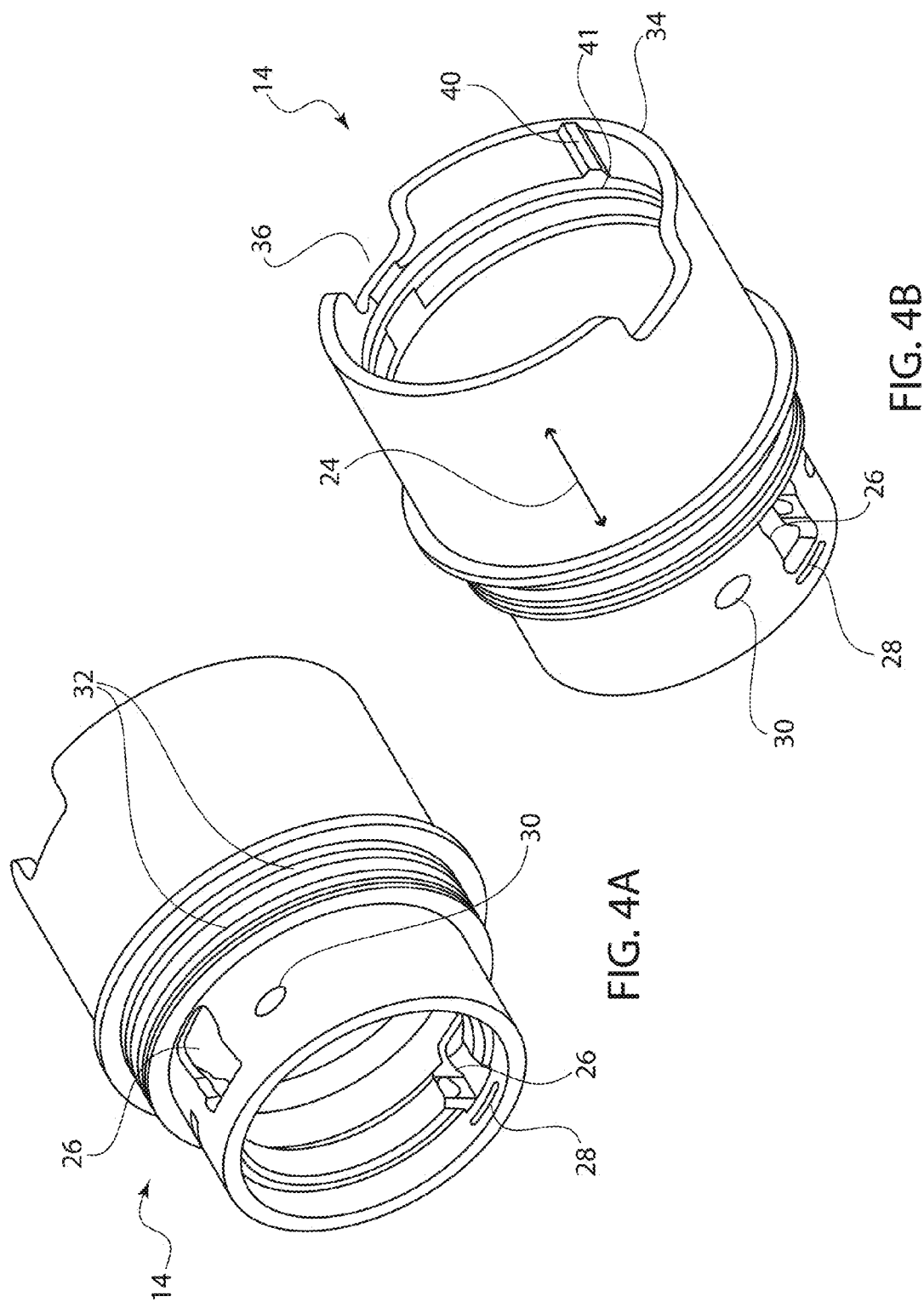

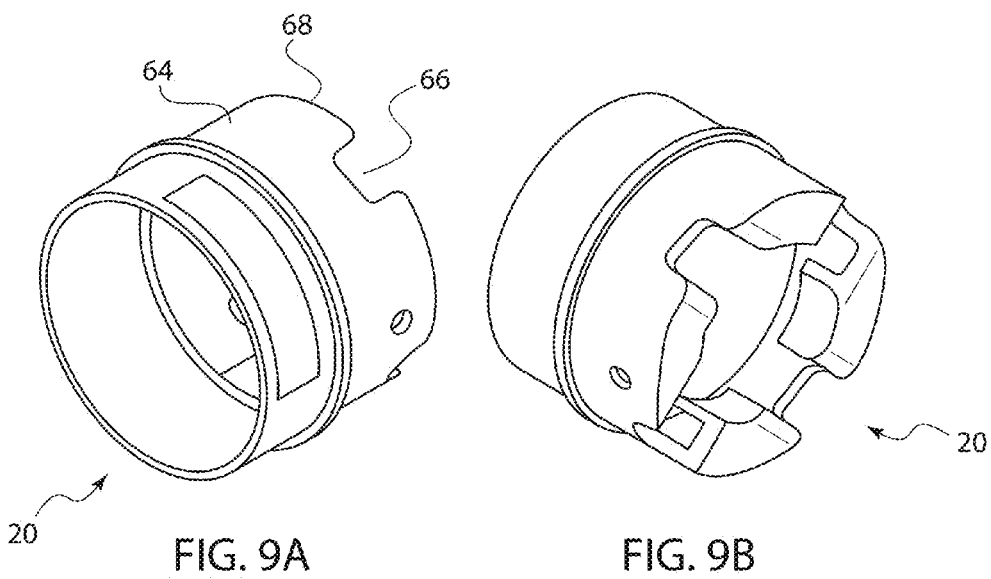
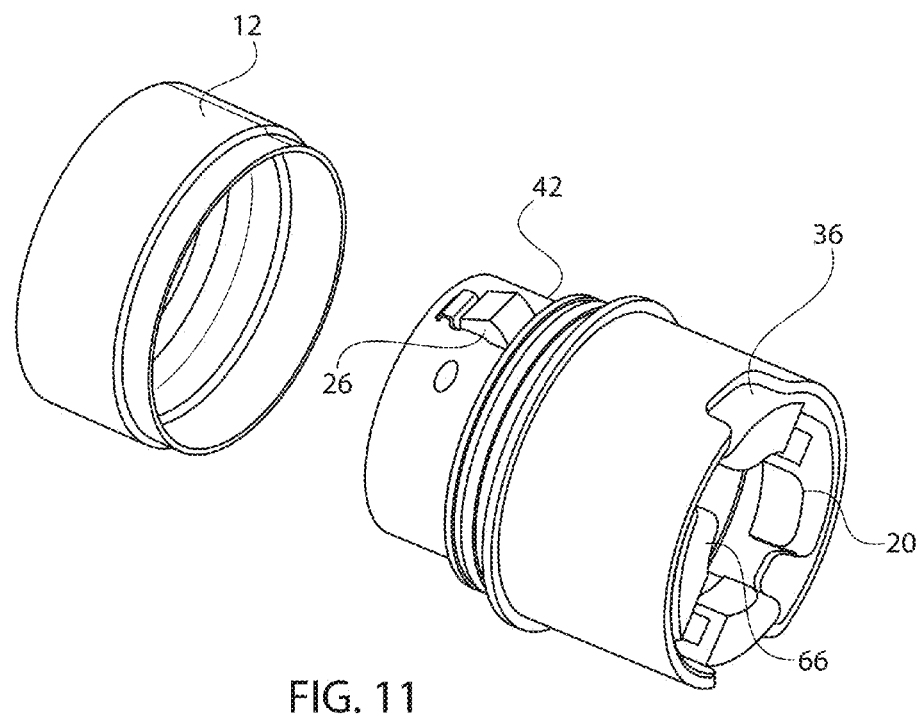

Unlocked

Levers pulled

In position

Locked

LEVER QUICK CONNECT INTERCOM FITTING

CROSS REFERENCE TO RELATED APPLICATIONS

This application is a continuation of U.S. application Ser. No. 14/154,267 titled "Lever Quick Connect Intercom Fitting," now allowed, which claims the benefit of U.S. Provisional Application Ser. No. 61/752,114, filed Jan. 14, 2013, titled "Lever Quick Connect Intercom Fitting," the entire contents of each of which are hereby incorporated by reference.

FIELD OF THE DISCLOSURE

Embodiments of the present invention relate generally to a lever quick connect and disconnect intercom fitting. The intercom fitting has a locking fit that features two independent locking systems that are generally operable together, without extra tools such as screwdrivers and clamp rings. The fitting may be operated by hand, and in some embodiments, with one hand. Levers secured by a blade spring provide a first locking feature, and a safety ring provides a second locking feature. These locking features are configured to work together but be separately activated to create secure and separate, independent locks.

BACKGROUND

Tank-to-tank connections are often required in the aerospace field, as well as other fields. For example, a tank-to-tank connection is generally needed for fuel transfer without leaks, particularly for helicopter or aircraft fuel systems. Generally, the connection between two tanks (which may be flexible material tanks or any other type of tank) is currently provided by a system that requires two flexible chimneys, a rigid sleeve, and metal clamps that are secured via screwdriver.

More specifically, prior art FIG. 1 shows one example of a prior art connection. This figure shows a first flexible chimney 1 that is first bonded to a rigid sleeve 3 on a tank. During assembly, a second flexible chimney 2 is assembled on the first flexible chimney 1 (generally using a lubricating means) and then fixed inside the tank by metal clamps 4 via a screwdriver.

The connection (fastening) process to connect the chimneys between two tanks typically takes a long time, and in some instances, lasts around fifteen minutes. Use of a screwdriver for the metal clamps during the assembly risks damaging the tanks or the flexible chimneys due to the constant pressure from screwing and unscrewing the clamps. The assembly also depends on the operator competence and strength during the assembly. This creates variability due to operator ability and the amount of force that s/he is able to put on the screws during the connection/tightening process. Additionally, during the lifetime of tanks, as the tanks are fixed by screwing, there can be a decrease of the clamping force. Additionally, after some time, due to rubber aging, the two flexible chimneys could begin to remain stuck together under the clamps, which can lead to a difficult disassembly and can add to maintenance issues. Accordingly, improvements to these fittings are desired and necessary.

BRIEF SUMMARY

Embodiments described herein thus provide a lever quick connect and disconnect fitting that provides a secure fit for tank-to-tank connections and prevents any leakage from occurring. The fitting provide two separate, independent locking features that can secure tank sleeves to one another. There is provided male and female components that are coupled together by a lever connect and by a safety ring.

BRIEF DESCRIPTION OF THE DRAWINGS

FIG. 4A shows a front perspective view of one embodiment of a male component.

FIG. 4B shows a side perspective of the male component of FIG. 4A.

FIG. 9A shows a rear perspective of one embodiment of safety ring.

FIG. 9B shows a front perspective view of the safety ring of FIG. 9A.

FIG. 11 shows the male and female components prior to being mated, with the levers and the safety ring in their pre-locked positions.

DETAILED DESCRIPTION

Embodiments of the invention described herein provide improved connections for tanks, and particularly for fuel tanks on-board aircraft and/or helicopters and other airborne vehicles. The connections described herein may also be useful with other vehicles that require secure connections between tanks for fuel transfer or other purposes.

The intercom fitting shown and described is used to perform tank-to-tank connection and fuel or air transfer with no leakage in helicopter and/or aircraft fuel systems. Between two flexible material tanks, the connection is generally ensured by rigid sleeves (formed by the pipes and rings as described below), with the pipes bonded to chimneys, which connect the system to the flexible material of the tank. The secure assembly of the two sleeves into each other as shown and described seals the connection. In order to guarantee no leakage, the intercom fitting must be sized properly, in relation to the internal pressure generated by the fuel transfer and crash effect. It should also meet ESD (electrostatic discharge) requirements. According to required standards, the intercom fitting must incorporate two separate locking devices, as a fail-safe measure, according to CS§29.607. The assembly should also have certain crashworthiness capabilities. For example, in one embodiment, the intercom assembly should resist drop tests as per CS§29.952. Selected materials for the intercom fitting may be, for example, a lightweight metal or alloy (such as 2024 aluminum) or a high-performance thermoplastic polymer (such as Polyphthalamide (PPA) with ESD properties) for mass saving. These are non-limiting examples only. In order to ease the assembly and the maintenance, the two independent locking devices are preferably fastened together through easy movements, preferably via one hand, and without tooling requirements.

Figure 1:
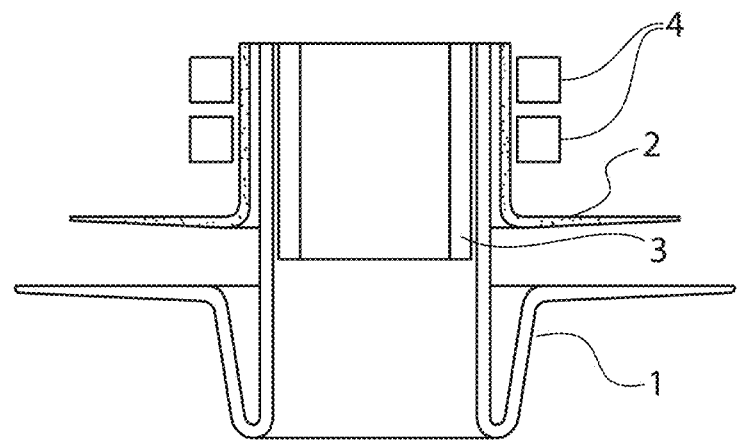
FIG. 1 shows a side schematic view of a prior art fitting assembly.
Figure 2:
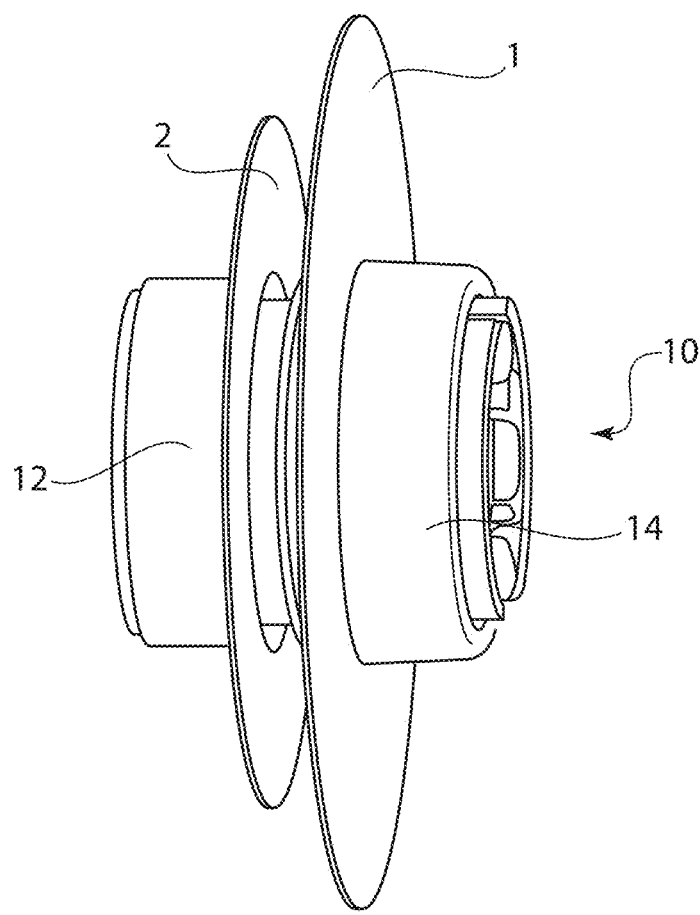
FIG. 2 shows a side perspective view of a fitting assembly that according to certain embodiments described herein.
Figure 3:
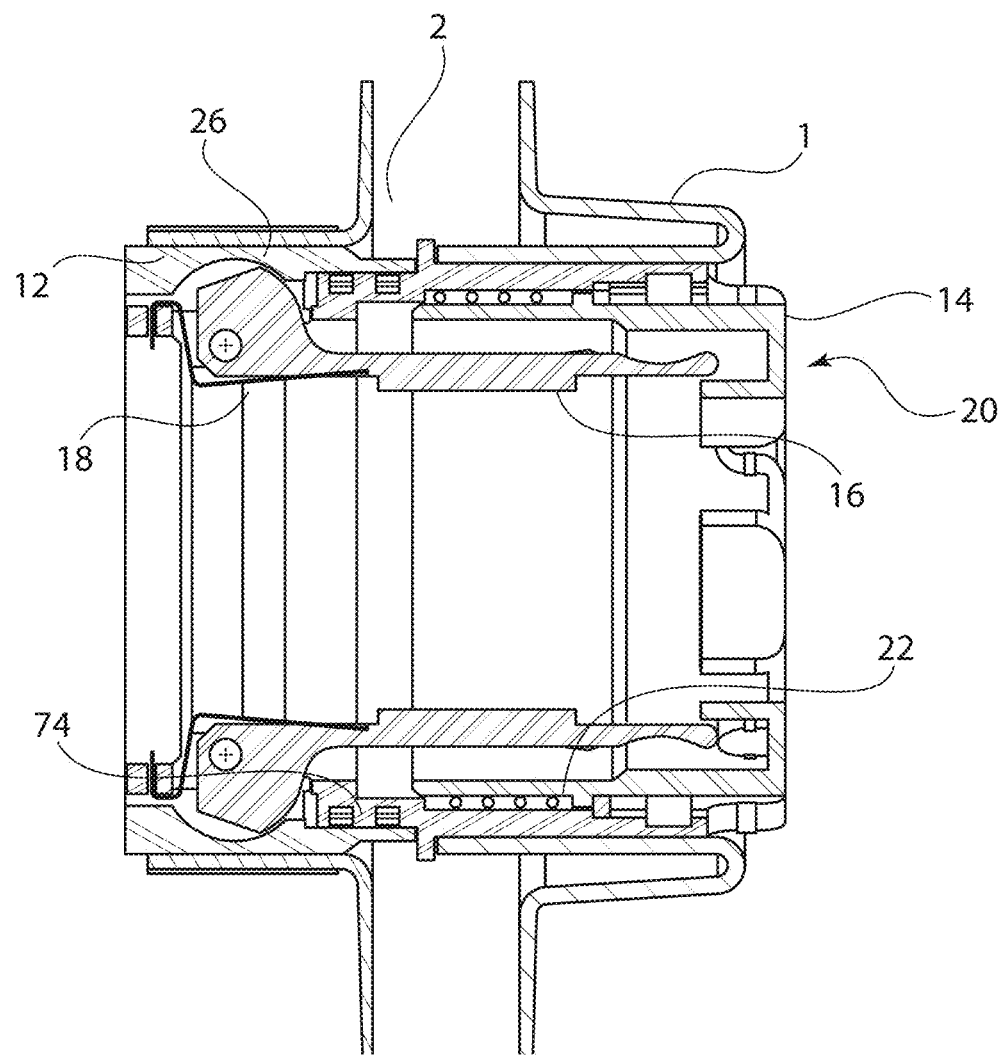
FIG. 3 shows a side plan view of a fitting assembly having a male and female component that are mated via a lever lock and a safety ring.

FIG. 2 illustrates two chimneys 1, 2, between which there is a secure intercom fitting 10. The fitting 10 generally includes a female component 12 and a male component 14 that are designed to mate with one another. FIG. 3 shows an overview of the male and female components 12, 14 as they are secured to one another with two independent locking features secured. A first locking feature is provided by levers 16 that are secured by a blade spring 18. A second locking feature is provided by a safety ring 20 that rotates and translates into place. A coil spring 22 and retaining ring 72 can help secure safety ring 20 in place. More details and views of the features of the fitting 10 components are shown in the following figures.

As shown in FIGS. 4A and 4B, the male component 14 has an outer bonding surface 24 that allows it to be bonded to one of the chimneys 1, 2. The male component 14 also has an opening 26 through which a base portion of a lever 16 will protrude. As shown, two openings 26 may be provided such that two levers 16 may be used, but it should be understood that more than two openings 26 and levers 16 may be used if desired. Adjacent the opening 26 is a groove 28 for receiving a portion of the blade spring 18 (shown in FIG. 6). Again, two grooves 28 may be provided such that two blade springs 18 may be used to secure two levers 16, but it should be understood that more than two grooves 26 and blade springs 18 may be used if desired. The male component 14 also has a hole 30 for receiving a hinge pin. Outer grooves 32 may also be provided in order to create a secure seal 74 with the female component 12.

An outer edge 34 of the male component 14 (opposite from the side with openings 26 for the levers) has finger grooves 36 for accessibility to the tips of the levers 16. An inner surface near the edge 34 has an inner groove 40 for receiving translational movement of a driving pin 70 of the safety ring 20 (detailed below). The male component also has an inner circumferential groove 41 for receiving rotational movement of the driving pin of the safety ring 20.

Figure 5A:
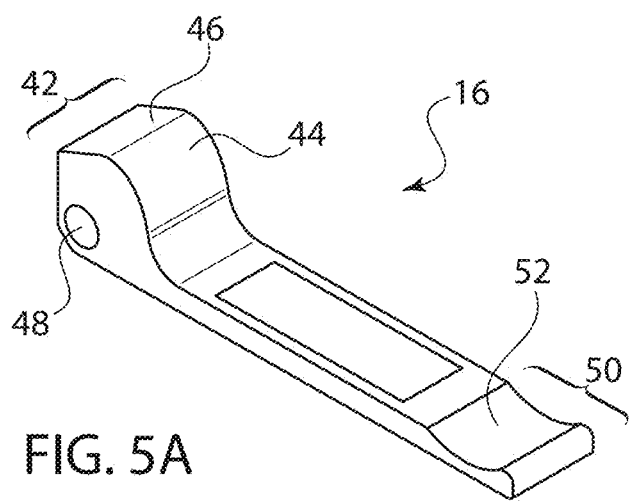
FIG. 5A shows a side perspective view of one embodiment of a lever.
Figure 5B:
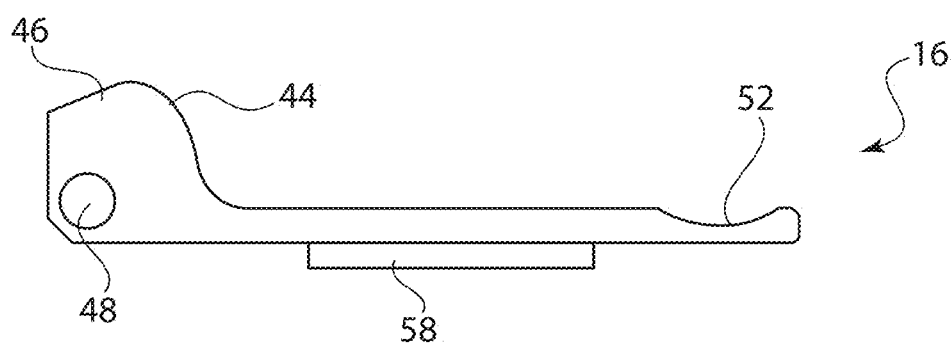
FIG. 5B shows a side plan view of the lever of FIG. 5A.

FIGS. 5A and 5B show perspective and side views of one embodiment of one of the levers 16 that may be positioned with respect to the male component 14. The lever 16 has a base portion 42 and a tip portion 50. Base portion 42 has a hole 48 for receiving a hinge pin in order to secure lever 16 into place with respect to the male component 14 at hole 30. This allows inward motion of the lever 16 with respect to the male component 14.

The base portion 42 is also shown as having a generally curved outer radius 44 and a rear flat surface 46. In use, the lever 16 is pulled down to cause the base portion 42 to rotate against a hinge pin. This rotation exposes the rear flat surface 46 through the opening 26 of the male component 14, which allows the male component 14 to mate with the female component 12. When the lever 16 is released, the curved outer radius 44 moves into cooperation with a corresponding curved surface 62 of the female component 12 (as shown in FIG. 7B). This locks the male and female components 12, 14 with respect to one another. A schematic showing this movement is illustrates by FIGS. 13A-13D, which will be described in more detail below.

The opposite end of the lever 16 comprises a tip portion 50 with an indentation surface 52. Indentation surface 52 provides a space for a user's fingers to access the lever 16 and to move it downward (toward an interior of the male component 14) and to cause rotation of the base portion 42, as shown in FIGS. 13B-13C. When pressure is released from the indentation surface 52 of the lever 16, the lever 16 is allowed to snap back to its horizontal position in the male component 14. One of the features that biases and secures the lever 16 in the horizontal position is the blade spring 18.

Figure 6:
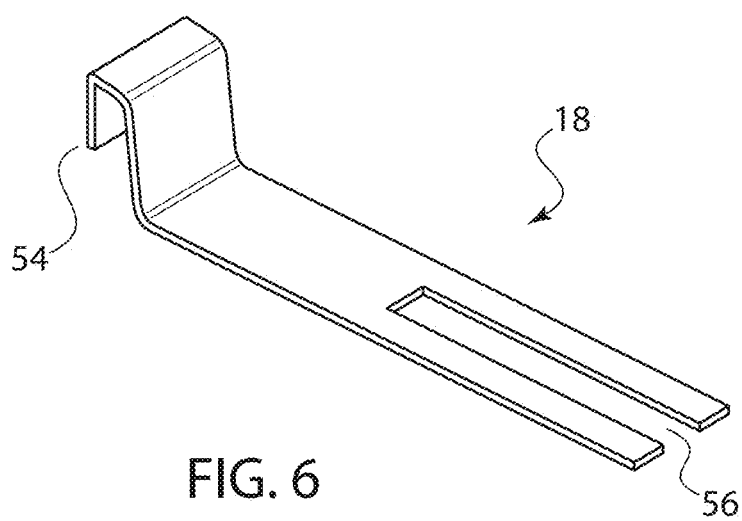
FIG. 6 shows a side perspective view of one embodiment of blade spring.

One embodiment of a blade spring 18 is shown in FIG. 6. Blade spring 18 has a lug 54 for securement with respect to the groove 28 of the male component 14. The lug 54 allows the blade spring 18 to be resiliently attached to the male component 14 near the base portion 42 of the lever 16. The blade spring 18 may also have a notch 56 that allows the blade spring 18 to lock against the lever 16. Referring back to FIG. 5B, the lever 16 has a protrusion strip 58 that can be received by the blade spring notch 56. FIG. 3 shows blade spring 18 is biased against the lever 16 in order to maintain it in position.

Figure 7A:
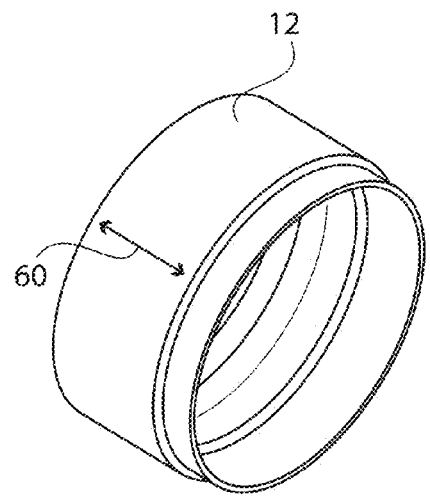
FIG. 7A shows a side perspective view of one embodiment of a female component.
Figure 7B:
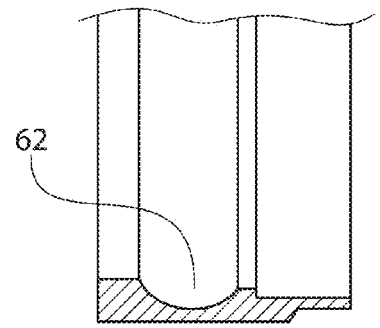
FIG. 7B shows a side plan view of a cross-section of the female component of FIG. 7A.
Figure 8:
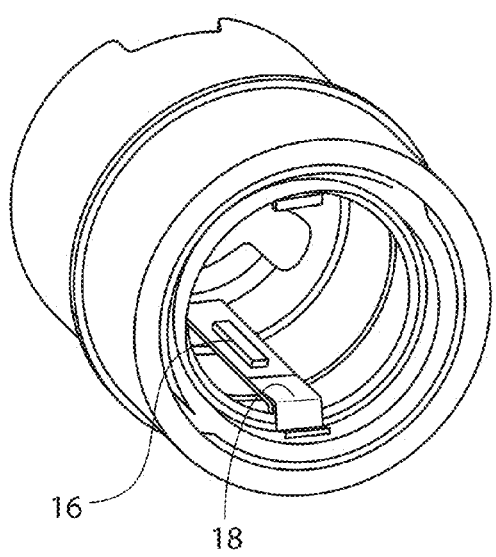
FIG. 8 shows a rear perspective view of the male and female components mated and the lever secured by the blade spring.

As shown in FIGS. 7A and 7B, the female component 12 has an outer bonding surface 60 that allows it to be bonded to one of the chimneys 1, 2. The female component 12 also has an internal cavity 62 that is shaped to receive at least a portion of the curved outer radius 44 of the lever 16 lever from the male component 14. Once the male and female components 12, 14 are mated or nested with respect to one another and the lever 16 is released, the curved outer radius 44 rotates into the corresponding curved internal cavity 62. Release of the lever 16 and securement by the blade spring 18 accomplishes a first locking feature. FIG. 8 shows one example of a blade spring 18 in place against a lever 16.

Figure 10:
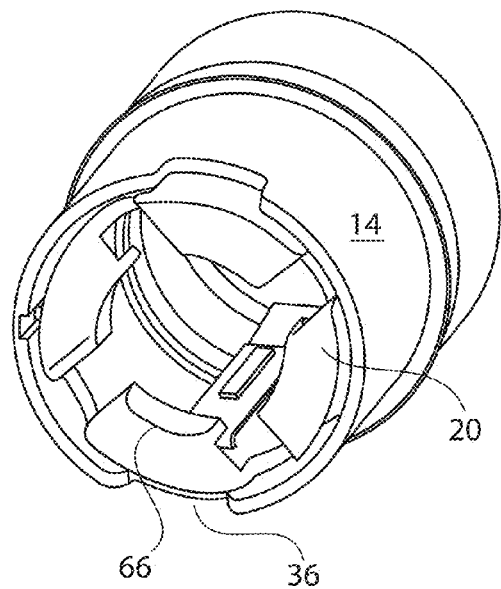
FIG. 10 shows a front perspective view of the male and female components mated and the lever secured by the blade spring, with the safety ring in its locked position.

Referring now to the second locking feature, FIGS. 9A and 9B show one embodiment of a safety ring 20 that provides the second locking feature. The safety ring 20 is designed to have an outer diameter that is just smaller than the inner diameter of the male component 14, such that the safety ring 20 is positioned inside the male component 14, as shown in FIG. 10. The safety ring 20 is shown as a cylindrical hollow body 64 with grooves 66 at one end that allow finger access for translational and rotational movement of the safety ring 20 with respect to the male component 14. When the safety ring 20 is in its locked and the male and female components are mated, the safety ring 20 prevents access to the levers 16 until/unless the safety ring 20 is turned to unlick the system.

Figure 12:
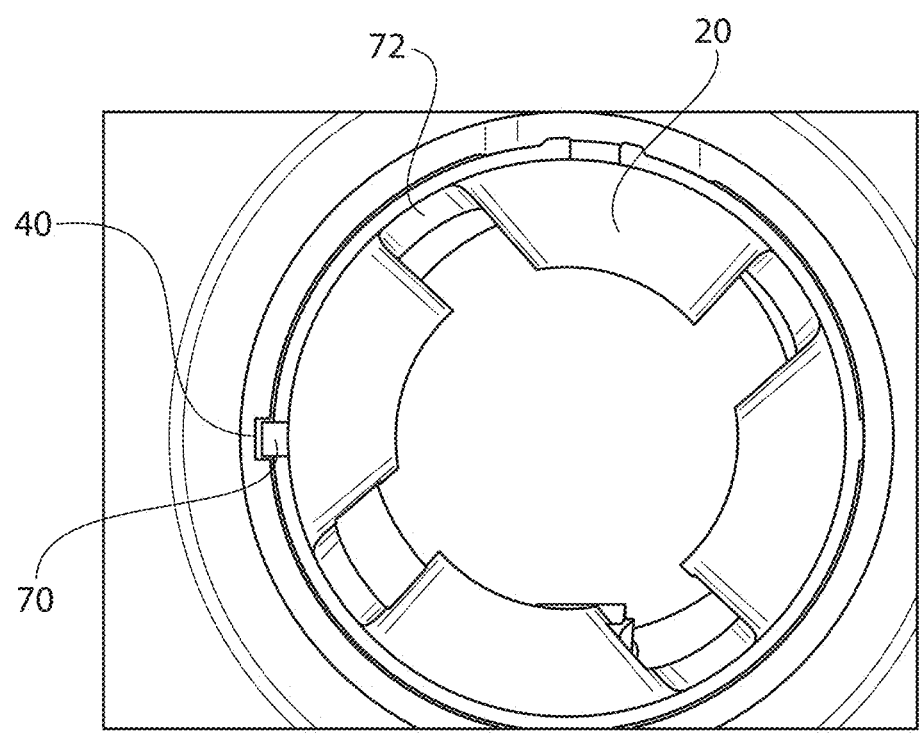
FIG. 12 shows a front plan view of a male component with a safety ring in position.

FIGS. 10 and 11 illustrate how the grooves 66 of the safety ring 20 are positioned so that they prevent access to the finger grooves 36 of the male component 14. As shown in FIG. 11, which illustrates the unlocked position (in which the male and female components 12, 14 are not secured to one another), the outer edge 68 of the safety ring 20 and the outer edge 34 of the male component 14 are shown as being generally adjacent or even with one another. The safety ring 20 also has a driving pin 70, which is shown in the end view of FIG. 12. The driving pin 70 cooperates in the inner groove 40 of the male component 14. The safety ring 20 is also maintained in place by a retaining ring 72.

Figure 13A:
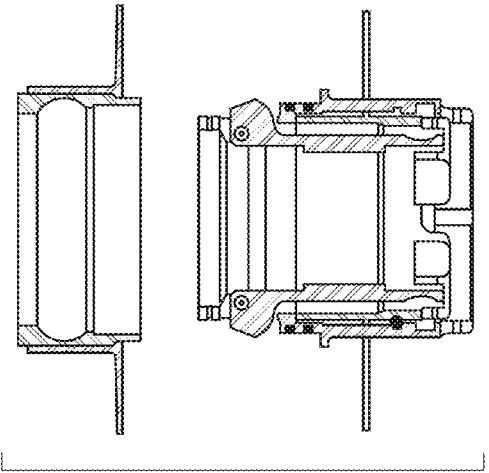
FIGS. 13A-13D show a schematic process of the mating of the male and female components.
Figure 13B:
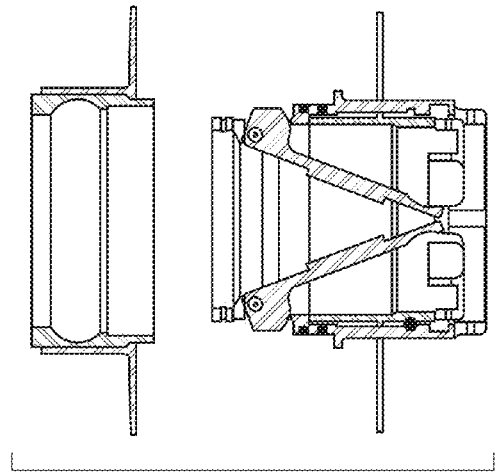
Figure 13C:
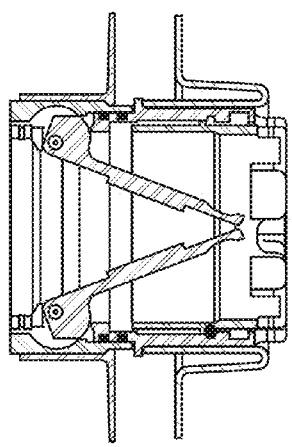
Figure 13D:
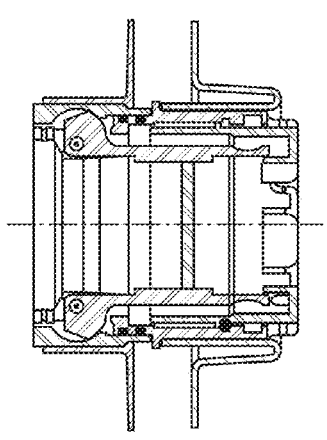

The connection sequence between the male and female components is shown in FIGS. 13A-13D. FIG. 13A shows the components prior to being secured to one another. FIG. 13B shows the levers 16 of the male component 14 pulled inwardly. FIG. 13C shows the male and female components as they are nested or mated with respect to one another. FIG. 13D shows the levers once released and the safety ring once rotated to the locked position.

Figure 14:
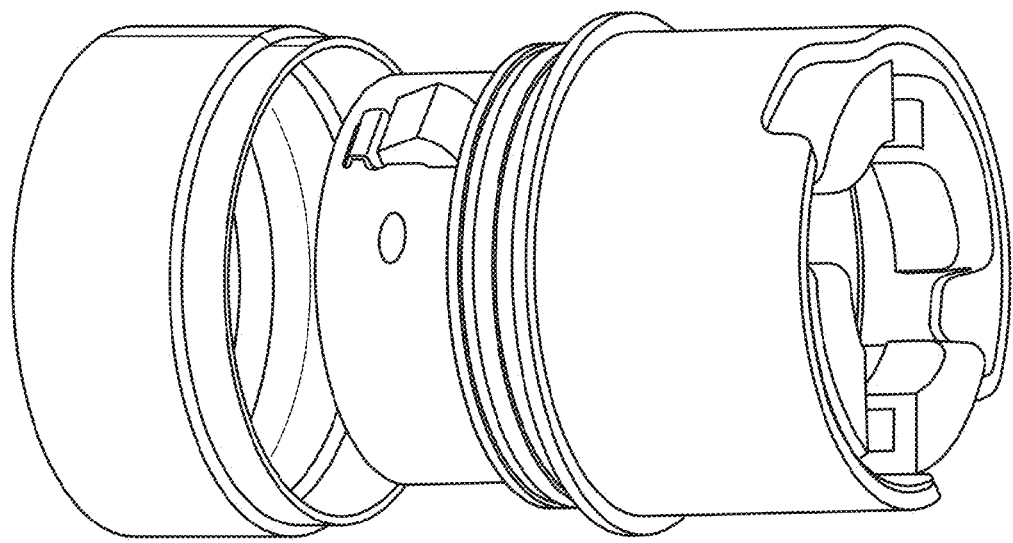
FIG. 14 shows a side perspective view of the unlocked position of FIG. 13A, as the safety ring has been rotated so that the finger grooves of the male component and safety ring align.
Figure 16A:
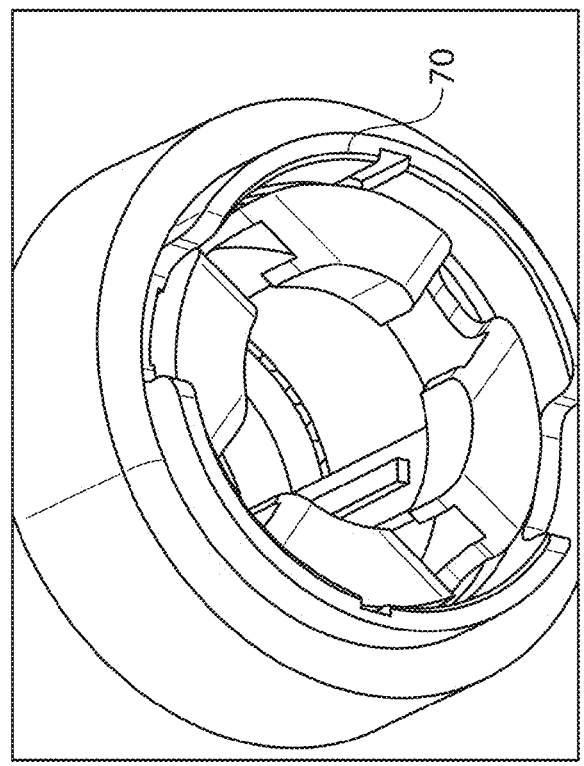
FIGS. 16A and 16B show a front perspective view of the transition of the fitting as the safety ring is being rotated back so that the driving pin aligns with the inner groove.

Referring now more specifically to each step, when the safety ring 20 is to be moved in order to allow access to the lever 16 for locking, the user presses the safety ring 20 inward with respect to the male component 14. The driving pin 70 of the safety ring 20 translated back, within the inner groove 40, to cause the edge 68 of the safety ring 20 to retreat into the male component 14. The safety ring 20 laterally translates with respect to the male component 14. Once the driving pin 70 reaches the base of the groove 40, the safety ring 20 can now be rotated with respect to the male component 14. This is effected by applying pressure and a twisting motion to the safety ring 20. This motion causes the driving pin 70 to travel into a circumferential groove 41 of the male component 14, which groove 41 is shown in FIGS. 4B and 16A. This motion also causes the edge grooves 66 of the safety ring 20 to align with the finger grooves 36 of the male component 14, as shown in FIG. 14.

Figure 15:
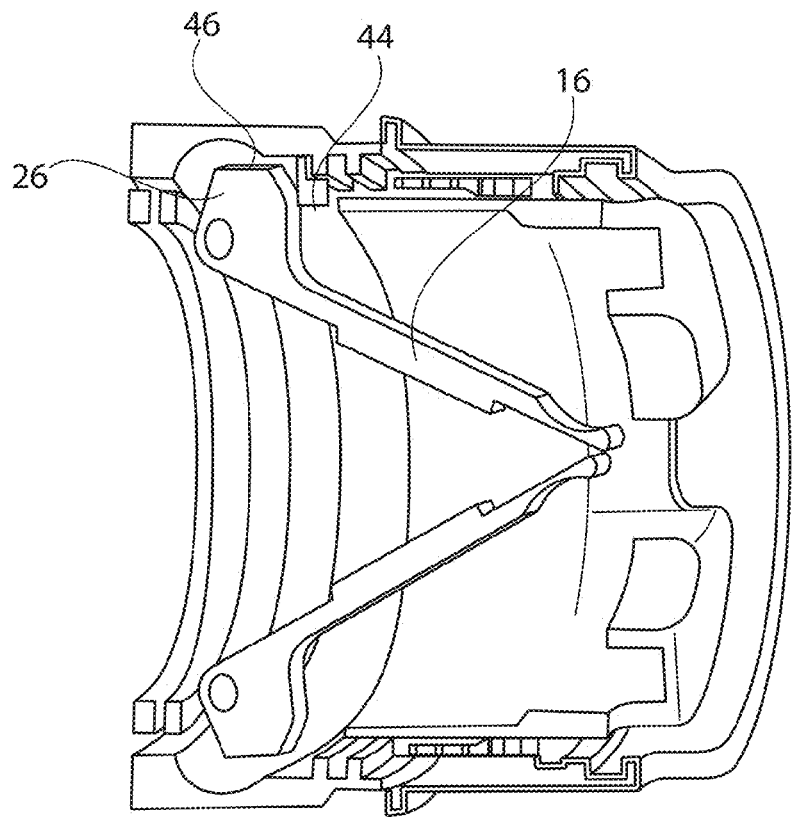
FIG. 15 shows a side perspective view of the levers being pulled inwardly so that the male and female components can mate of FIG. 13B.

This allows the user to access the levers 16 in order to press them inward, as shown in FIG. 15. When the levers 16 are pressed inward, this causes the outer curved radius 44 of the base portion 42 to rotate forward so that the rear flat surface 46 of the lever 16 is exposed though the opening 26 of the male component 14. (For example, FIG. 11 shows the base portion 42 of the lever 16 as it protrudes through opening 26.) Referring back to FIG. 15, when the levers are depressed, the generally flat rear surface 46 creates a flat surface of the male component that faces toward the internal cavity of the female component 12, rather than the curved radius surface 44 facing the cavity. Exposing the generally flat rear surface 46 creates a flatter sliding surface so that the male component 14 can nest with the female component 12. Once the components 12, 14 are nested as shown in FIG. 14, the levers 16 can be released. Release of the lever creates a secure lock between the components 12, 14. This causes activation of the two separate locking system features.

First, release of the levers 16 allows them to be biased back to the their original generally horizontal positions. The curved radius portion 44 of the levers 16 now extends from opening 26 and is allowed to rest in the internal cavity 62 of the female component 12, as shown in FIG. 3. The cooperation between these curved shapes 44, 62 together prevents the male component 14 from being pulled from or otherwise released from the female component 12 (until the levers are manually moved). The shape of the base portion 42 of the lever prevents the male component 14 from being extracted from the female component 12 or from otherwise translating with respect to the female component 12. The only way that the components 12, 14 can be released from one another is by re-accessing and depressing the levers 16 (and this is prevented by the second locking feature, the safety ring 20) to cause the flat rear surface 46 to be exposed. Additionally, once the levers 16 are released and moved to the horizontal position upon mating, the blade springs 18 snap into place in order to secure the levers 16 into place. Cooperation between the lever curved surface 44 and the female cavity internal cavity 62 maintains a first independent securement.

Figure 16B:
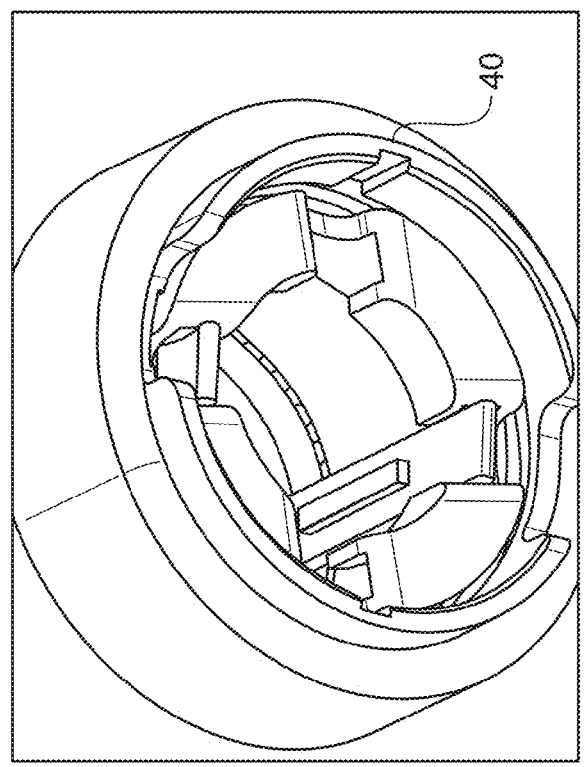
Figure 17A:
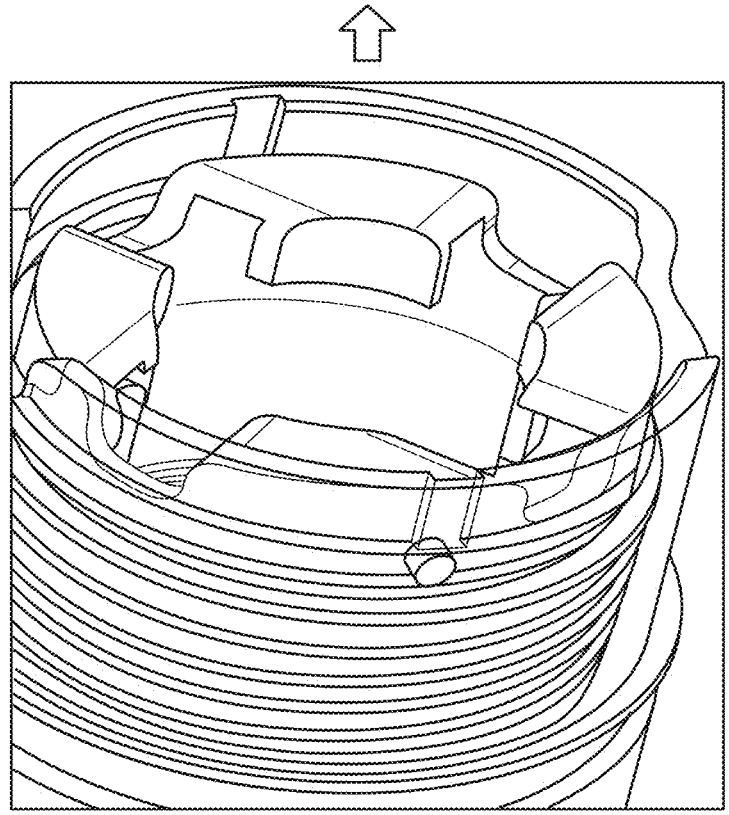
FIGS. 17A and 17B show a front perspective view of the transition of the fitting as the safety ring is being translated back into alignment with the edge of the male component.
Figure 17B:
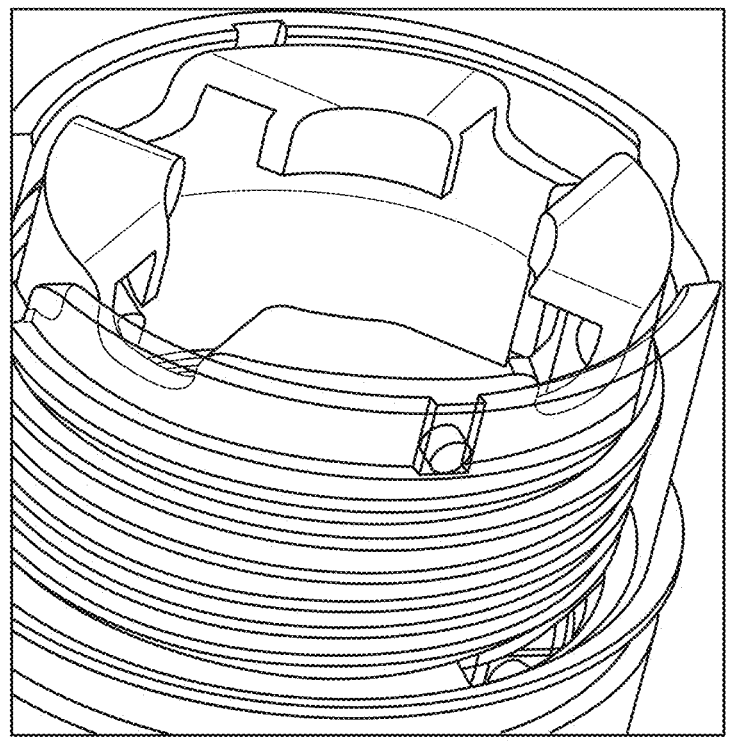

Second, once the user releases the levers 16, he should now rotate the safety ring 20 back to the position in which the grooves 36 and 66 occlude one another and are not aligned, as shown in the transition from FIG. 16A to 16B. This effects movement of the driving pin 70 in the circumferential groove 71 so that the pin 70 now aligns with the inner lateral groove 40 of the male component 14, as shown in FIG. 17A. Release of pressure from the safety ring activates a coil spring 72, which forces the safety ring 20 laterally forward so that edge 68 of the safety ring 20 aligns with the outer edge 34 of the male component, as shown in FIG. 17B. This creates a locked configuration that is held in place by the coil spring 22 and the retaining ring 72. The safety ring 20 maintains a second independent securement.

Figure 19:
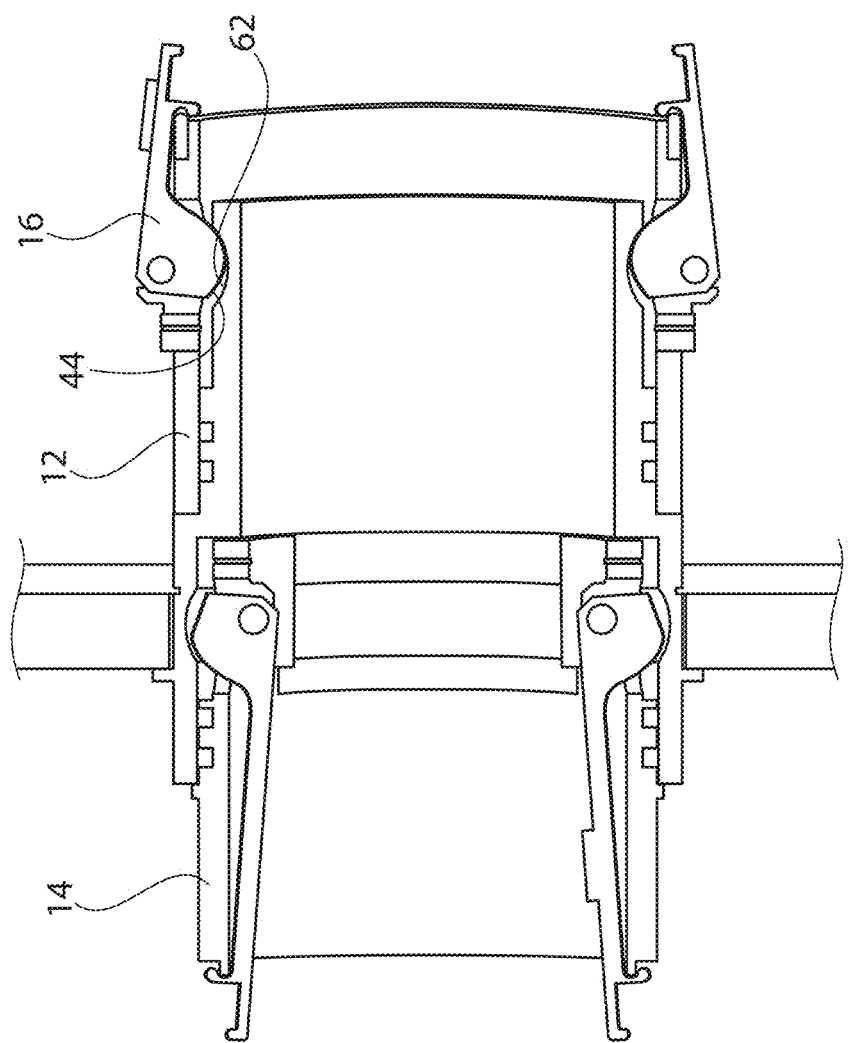
FIG. 19 shows an embodiment of the fitting in which the levers are positioned on the female component in a secured configuration.
Figure 20:
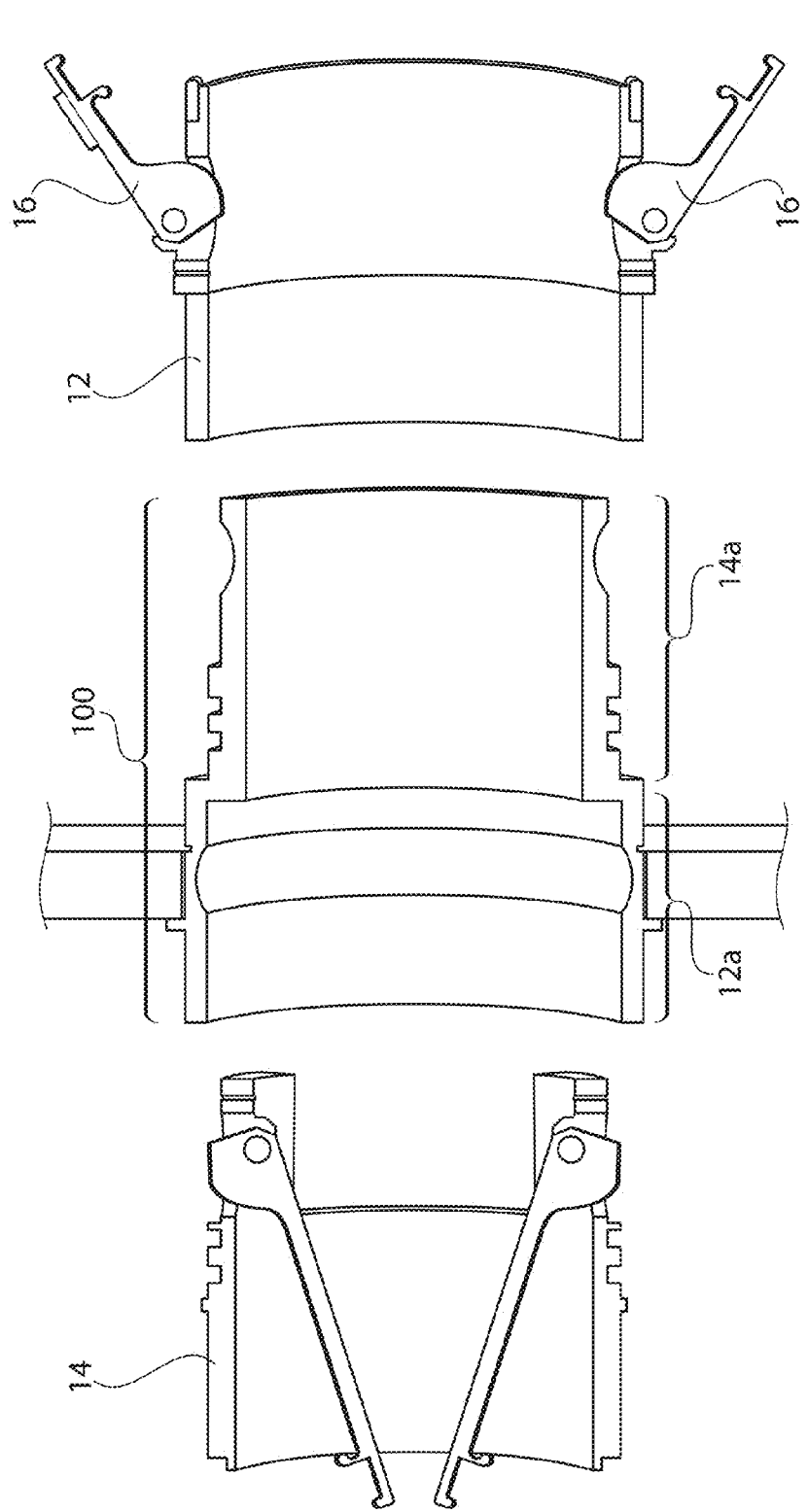
FIG. 20 shows the embodiment of the fitting of FIG. 19 in an exploded apart configuration.

Although this description provides the levers 16 and safety ring 20 as positioned on the male component 14, it should be understood that these elements may be moved to a female component without departing from the spirit and scope of this disclosure. Examples of this are illustrated by FIGS. 19 and 20, illustrating levers 16 positioned on a female component 12. In this example, the female component 12 receives a male component end 14a of an intermediate component 100. The male component end 14a is shown having a curved internal cavity 62. Securement of the components in place with respect to one another may be achieved by rear clips on the levers that are positioned with respect to an end stop of the male component end 14a. Moreover, although two levers 16 are generally described and shown, it is possible to effect the invention with more than two levers 16 if desired.

Figure 18:
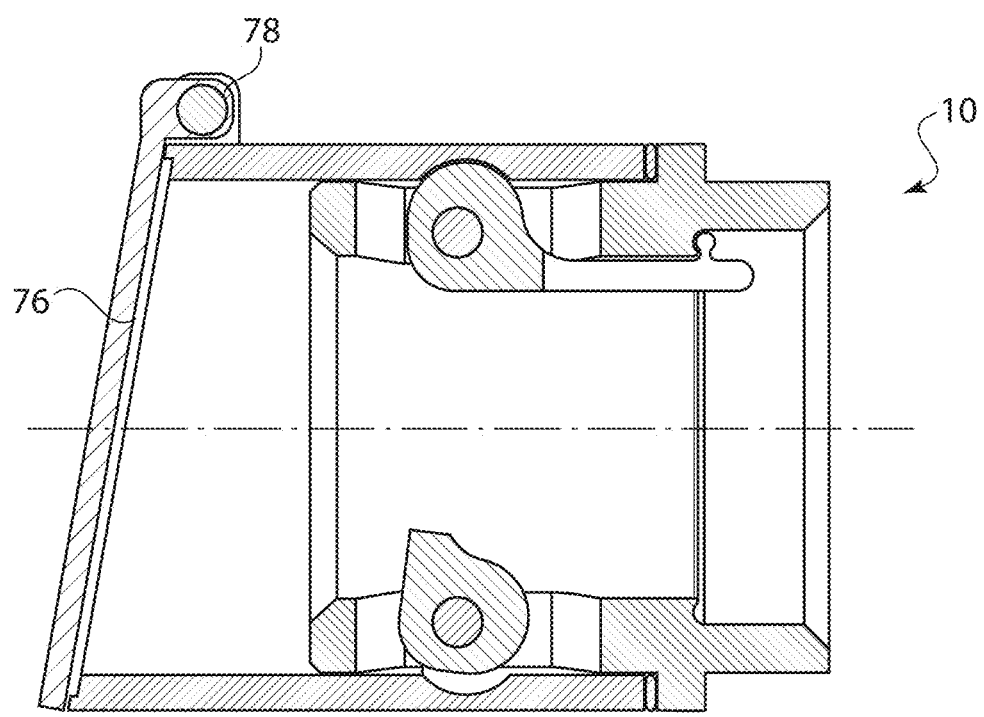
FIG. 18 shows an embodiment of the fitting in which the female component has an optional flap.

FIG. 18 shows an alternate option in which the fitting 10 has an optional flap valve 76. The flap valve 76 may be secured at a hinge 78 at either end of the fitting (e.g., at the male component end or at the female component end). Its primary function is to force the fuel flow in one direction.

Changes and modifications, additions and deletions may be made to the structures and methods recited above and shown in the drawings without departing from the scope or spirit of the invention and the following claims.

What is claimed is:

1. A quick connect intercom fitting for connecting two tanks, comprising:
   a. a male component and a female component, wherein the male component is received by the female component upon locking cooperation therebetween;
   b. wherein one of the male component or the female component comprises (i) one or more levers, each with a base portion having a curved outer radius and a generally flat rear surface, and (ii) an opening through which the base portion of the one or more levers is exposed, wherein when the one or more levers are released for engagement of the male and female component, the generally flat rear surface faces the opening to create a sliding surface, and wherein when the one or more levers are released to engage the male and female component in locking configuration, the curved outer radius faces the opening;
c. wherein the other of the male component or the female component comprises a curved internal cavity that can receive and secure the curved outer radius of the lever in locking configuration;
d. a blade spring comprising a lug and a notch; and
e. a second independent locking structure.

2. The fitting of claim 1, wherein the component comprising the one or more levers further comprises a groove for securing a blade spring.

3. The fitting of claim 1, wherein the component comprising the one or more levers further comprises one or more finger grooves.

4. The fitting of claim 1, wherein the component comprising the one or more levers further comprises one or more grooves for creating a seal with the other component.

5. The fitting of claim 1, wherein the one or more levers comprise an indentation surface.

6. The fitting of claim 1, wherein the one or more levers comprise a protrusion strip.

7. The fitting of claim 1, wherein the male and female components have outer bonding surfaces for securement to chimneys.

8. The fitting of claim 1, further comprising a flap for directing flow of fuel.

9. A quick connect intercom fitting for connecting two tanks, comprising:
a. a male component and a female component, wherein the male component is received by the female component upon locking cooperation therebetween;
b. wherein one of the male component or the female component comprises (i) one or more levers, each with a base portion having a curved outer radius and a generally flat rear surface, and (ii) an opening through which the base portion of the one or more levers is exposed, wherein when the one or more levers are released for engagement of the male and female component, the generally flat rear surface faces the opening to create a sliding surface, and wherein when the one or more levers are released to engage the male and female component in locking configuration, the curved outer radius faces the opening;
c. wherein the other of the male component or the female component comprises a curved internal cavity that can receive and secure the curved outer radius of the lever in locking configuration; and
d. a second independent locking structure that comprises a safety ring, and
f. a coil spring for securement and movement of the safety ring.

10. The fitting of claim 9, wherein the safety ring comprises one or more grooves for allowing access to the one or more levers.

11. The fitting of claim 9, wherein the component comprising the one or more levers further comprises a groove for securing a blade spring.

12. The fitting of claim 9, wherein the component comprising the one or more levers further comprises one or more finger grooves.

13. The fitting of claim 9, wherein the component comprising the one or more levers further comprises one or more grooves for creating a seal with the other component.

14. The fitting of claim 9, wherein the one or more levers comprise an indentation surface.

15. The fitting of claim 9, wherein the one or more levers comprise a protrusion strip.

16. The fitting of claim 9, wherein the male and female components have outer bonding surfaces for securement to chimneys.

17. The fitting of claim 9, further comprising a flap for directing flow of fuel.

18. A method for connecting two tanks, comprising:
a. providing a fitting comprising:
i. first and second component, each configured to cooperate with one of the two tanks, the first component comprising at least two levers and a safety ring;
ii. wherein the at least two levers each comprise a base portion with a curved outer radius and a generally flat rear surface, wherein the generally flat surface creates a sliding surface upon cooperation between the first and second components, wherein the curved outer radius that protrudes from an opening in the first component upon locking configuration, and wherein the second component comprises an internal cavity to receive the base portion of the levers; and
iii. wherein the safety ring provides an independent locking function,
iv. wherein movement of the at least two levers allows a mating of the first and second components and provides a first locking feature; and
v. wherein translational and rotational movement of the safety ring with respect to the first component creates a second locking feature;
b. causing translational and rotational movement of the safety ring in order to access the at least two levers;
c. depressing the at least two levers;
d. mating the at least two components;
e. releasing the at least two levers to create a first lock;
f. releasing the safety ring to allow its rotational and translational movement to create a second lock.

* * * * *